Sept. 16, 1952  F. C. VICTORY  2,610,552
ROTARY TABLE

Filed Jan. 17, 1950  3 Sheets-Sheet 1

INVENTOR.
FREDERICK C. VICTORY
BY
John H. Hanrahan
ATTORNEY

Sept. 16, 1952     F. C. VICTORY     2,610,552
ROTARY TABLE

Filed Jan. 17, 1950     3 Sheets-Sheet 2

INVENTOR.
FREDERICK C. VICTORY
BY
*John H. Hanrahan*
ATTORNEY

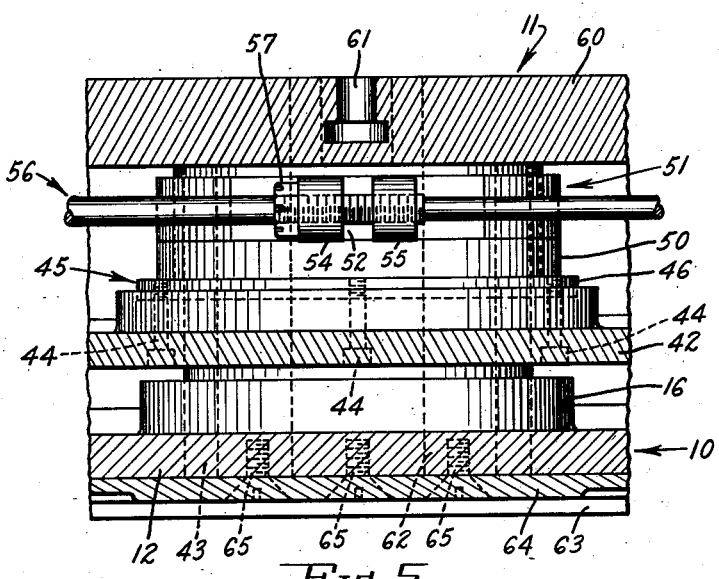
Fig. 5
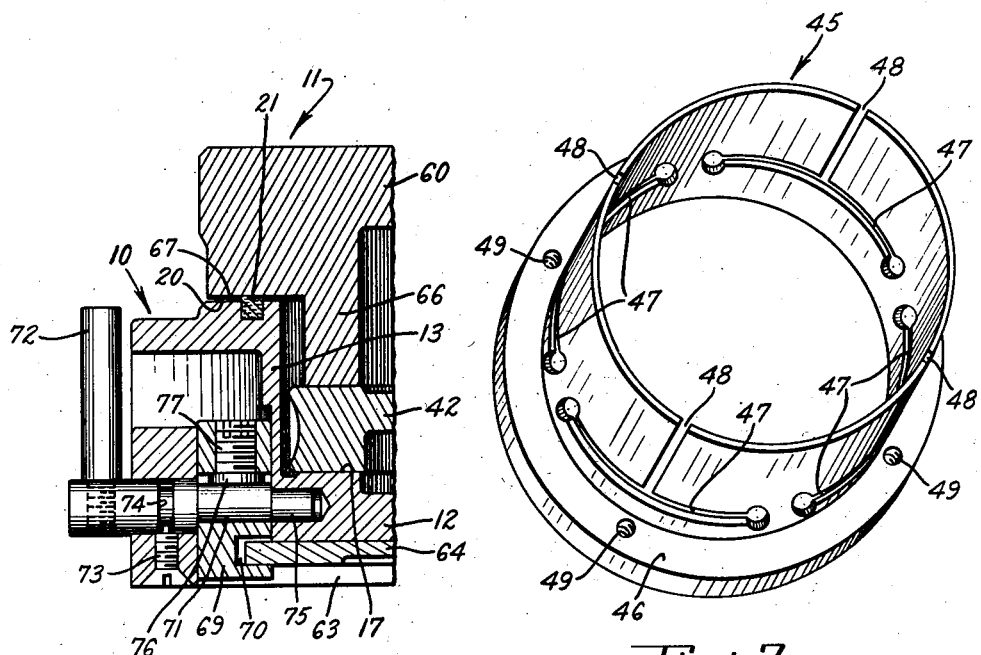
Fig. 6
Fig. 7
INVENTOR.
FREDERICK C. VICTORY
BY
John A. Hanrahan
ATTORNEY Patented Sept. 16, 1952

2,610,552

UNITED STATES PATENT OFFICE 2,610,552

ROTARY TABLE

Frederick C. Victory, Milford, Conn., assignor to Moore Special Tool Co., Inc., a corporation of Connecticut Application January 17, 1950, Serial No. 139,068

7 Claims. (Cl. 90—58)

1

This invention relates to new and useful improvements in rotary tables and has particular relation to a rotary table for supporting work on the bed of a machine to present or support a work piece in the desired angular relation to the tool or tools of such machine.

An object of the invention is to provide a rotary table for the purpose described and comprising a base and a table turret rotatable on such base, a constantly meshing worm and worm gear, means for turning said worm and worm gear, and manually operable means for connecting said worm and worm gear with said table or turret for turning of the latter with the former and for releasing the table from the worm and worm gear for turning independent of the latter.

Other objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings;

Fig. 5 is a detail sectional view on a larger scale, the view being taken as indicated by the line 5—5 of Fig. 3;

Fig. 6 is a similar view through a locking means, the view being taken along the plane of the line 6—6 of Fig. 3; and Fig. 7 is a perspective view of a locking means employed.

Figure 1:
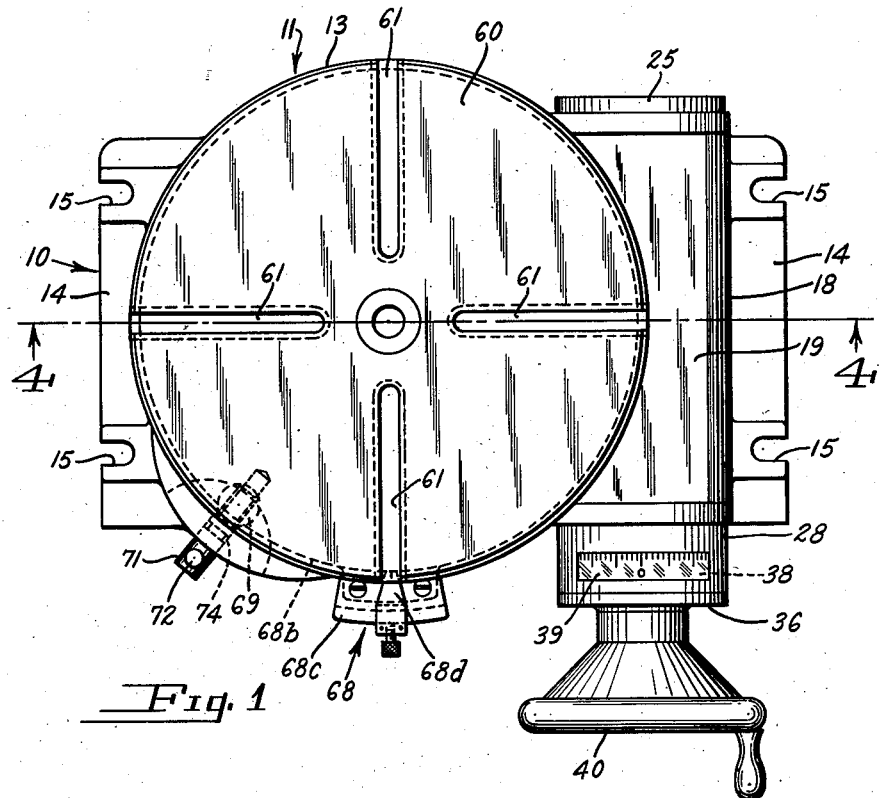
Fig. 1 is a top plan view of the rotary work table of the invention.
Figure 2:
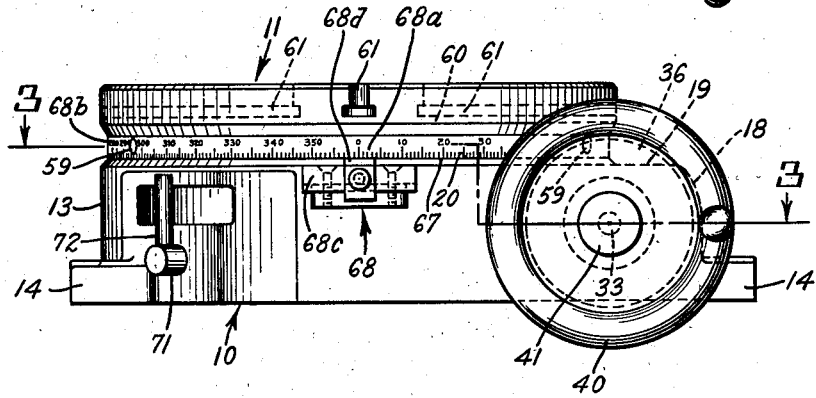
Fig. 2 is a front edge elevational view thereof.

Referring in detail to the drawings, my improved work holder or rotary table is shown as comprising a base generally designated 10 and a turret table 11. Base 10 comprises a one-piece structure in the form of a casting and includes a bottom wall 12 supporting a vertical wall 13 in concentric relation with the axial center of the base. Extensions or webs 14 at opposite sides of the base are provided with slots 15 to accommodate clamping bolts for clamping the base against the bed or work supporting table of a machine.

Inwardly of the wall portion 13, but in concentric relation therewith, the bottom wall 12 of the base is thickened providing an annular central bearing portion 16 and then outwardly of such portion and adjacent the wall 13 such bottom wall 12 is again thickened and is machined off providing an annular bearing surface 17.

At one side the base 10 is laterally extended providing a closure portion including a vertical wall 18 and a horizontal top wall-like portion 19, the latter carrying a bearing surface portion 20, the upper sudface of which is horizontally aligned with and is concentric with the upper surface of the wall 13. The upper surface of wall 13 and of portion 20 together form a substantially continuous annular support as will be described and in such surfaces there is carried a piece of felt or the like 21, preferably containing oil and as later will be set forth providing a dust and chip guard.

The base extension including the wall portions 18 and 19 mounts a pair of bearing devices 22 and 23 in which are rotatably received the end portions of a tubular worm 24. The bearing portion 22 is inserted in place and then the inner end of the housing is closed by means of a plate 25 secured to the bearing by screws 26 and to the housing by screws 27. Over the front end of such housing portion there is secured an annular member 28 held in place as by screws 29.

A shaft 30 has a narrow slotted portion 31 at its inner end into the slot of which enters a key 32 rigid with the worm 24. Thus, this shaft 30 and the worm 24 are keyed together for rotation as a unit but for slight relative longitudinal movement. As the worm is held in the bearings 22 and 23 it is apparent that any such relative longitudinal movement will be due to longitudinal movement of the shaft 30.

Shaft 30 includes an outer reduced diameter end portion 33 about which is a sleeve 34 secured to such shaft portion by a key 35. Then inwardly of the housing 28 which is closed at its forward end as by a plate 36 secured by screws 37, a drum 38 is turnable on the shaft portion 33. This drum 38 will be graduated about its outer periphery, the graduations to be read through a window 39 in the face of the housing 28. Hand wheel 40 is fast with the sleeve 34 and thus on turning of this hand wheel, the sleeve will be turned as will the shaft 30 and the worm 24.

However, when a nut 41 is loosened, the sleeve 34 is not jammed against a portion of the drum 38 and the parts may be turned relatively for zeroing. Thereafter, on tightening of the nut 41, the parts are drawn together and the drum will turn with the hand wheel 40. Any longitudinal movement of the shaft resulting from this turning of the nut 41 is made possible by the arrangement keying the shaft to the worm. From the foregoing description, it will be seen that the worm 24 is fixed in position in permanently located bearings and is susceptible of no movement other than turning movement about its own longitudinal axis.

Worm 24 meshes with a worm gear 42 located within the base 10. Such worm gear has the lower side of its outer peripheral portion against the machined surface 17 previously referred to and the inner hub-like portion of the worm gear is turnable about a vertical post 43 turnable in the hub-like portion 16 of the base. This post 43 is shown as tubular of an outside diameter only sufficiently less than the internal diameter of the hub of the worm gear 42 to permit of relative turning of these parts except when they are secured thereto by means to be described.

Fixed to the upper side of the hub portion of the gear 42 as by bolts 44 is a split spring sleeve generally designated 45 and shown alone in Fig. 7. This sleeve includes an integral annular flange 46 at its lower end and then the sleeve, which is of spring metal, is provided with various circumferential and longitudinal slots 47 and 48 whereby the sleeve is adapted to be slightly contracted and then on release to expand. In its flange 46, the sleeve is provided with tapped openings 49 into which the bolts 44 are threaded for drawing this flange against the upper side of the hub portion of the worm gear 42. With this construction, it will be seen that the spring split sleeve 45 is rigid with the worm gear 42 and that with the latter the sleeve may rotate about the post 43.

Means are provided for contracting this split sleeve against the outer surface of the post 43 whereby to secure the sleeve and thus the worm gear 42 to such post to have all of such elements fixed together into a unit. To the desired end, a spacer 50 which may be an annulus is located about the sleeve at the upper side of the flange 46 and then about the sleeve and supported against gravitational movement by the spacer 50 is a split spring ring 51. This split ring is split as at 52 and opposite said split may be thickened as at 53 for strength and at the opposite sides of its split is provided with lugs 54 and 55 having tapped alined openings.

A rod or bar 56 passes through such openings and in its portion in the openings is threaded. A nut 57 is pinned to the bar at the outer side of one of these lugs. The ends of the bar 56 are suitably shaped as at 58 to receive a tool or to be gripped by such a tool whereby the bar may be rotated on its own axis for drawing the end portions 54 and 55 of the split ring 51 toward one another to draw the split sleeve 45 tight against the post 43 and thereby secure the worm gear 42 to said post for turning movement therewith.

Thereafter, bar 56 may be rotated in the opposite direction to permit of the split ring-like clamp 51 extending to permit of expansion of the split sleeve 45 whereby to release it from the post 43 to permit of independent turning movement of the latter and the worm gear. Preferably, the outer end portions of the bar 56 terminate in recesses within the turret table 11, the open ends of such recesses being suggested at 59 in the drawings.

Figures 3, 4:
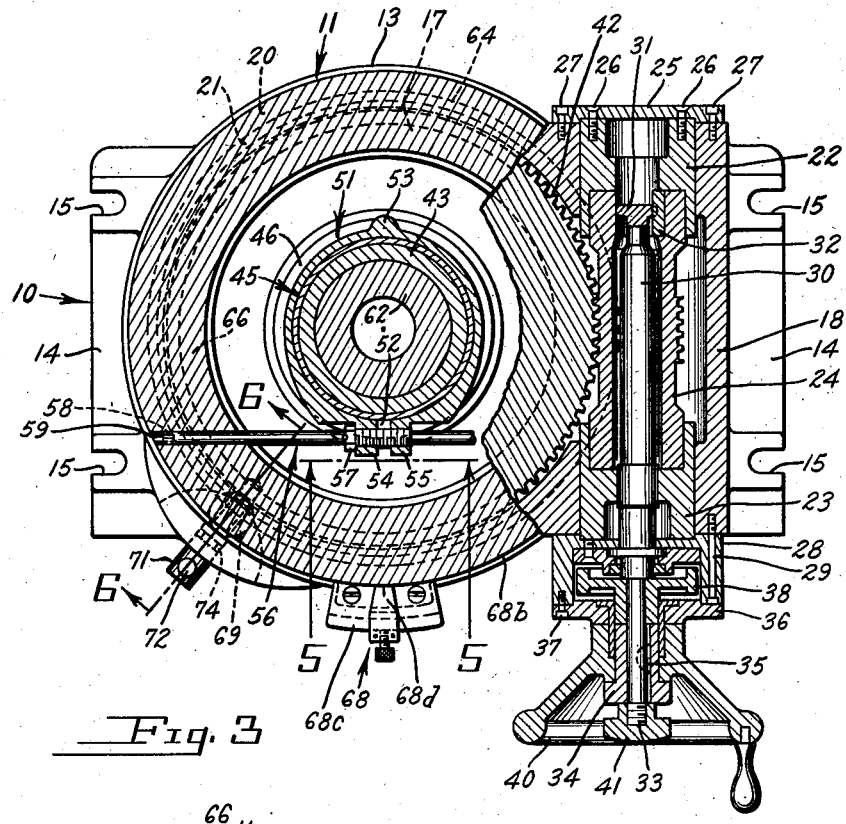
Fig. 3 is a horizontal sectional view taken as along the plane of the line 3—3 of Fig. 2.
Fig. 4 is a vertical sectional view taken as along the plane of the line 4—4 of Fig. 1.

The turret table 11 includes a relatively heavy upper table-like portion including a top wall 60 having radially extending inverted T-shaped slots 61 for cooperation with T-bolts or the like for the clamping of work or a work holder onto the table. This table top 60 is rigid and is shown best in Fig. 4 as actually integral with a heavy walled tubular spindle 62 received within the post 43. This spindle 62 and the post 43 have a tight fit or are otherwise secured together so that they are only rotatable as a unit. The lower side of the base 10 is recessed as at 63 and in this recess is located an annular plate or disc 64 secured to the lower end of the spindle 62 as by screws 65. Plate or disc 64 does not project below the bottom side of the base 10 and so will not interfere with mounting of the base on the bed or work table of a machine and will be free to turn in the recess 63 even though the base is mounted on a flat bed or work table of a machine.

Table 11 in addition to its top 60 includes a depending annular portion 66 located inwardly of the annular wall 13 of the base and having its lower end located to assist in guiding movement of the outer peripheral portion of the worm gear 42. Then outwardly of such portion 66 table 11 includes a downwardly facing surface portion 67 overlying the upper surface of the base wall 13 and the base portion 20 and which may have bearing thereon. It will now be seen that the compressible material 21 cooperating with these opposed surface portions of the base and table serve to exclude dust from entering between them and also may provide a means for supplying lubrication to these opposed surfaces.

At the front side of the table and base and mounted thereon is an additional zeroing or indicating device generally designated 68. For cooperation with device 68, graduations 68a are formed on the vertical table portion 68b. Device 68 includes a mounting lug 68c and a zero pointer 68d. When a piece of work is clamped on table 11, the released table is adjusted to align the work as with the direction of travel of the machine table. This may be, for example, a rotary movement of seventeen degrees. Then the zero pointer may be shifted on block 68c three degrees to line up with the twenty degree mark of the graduations 68d. Thereafter step-by-step adjustments are more easily computed. Such other adjustments are made by turning of wheel 40 and rough adjustments are visible by watching the graduations 68a and the final exact adjustment is seen through the glass 39.

With the construction described, it will be seen that the teeth of the worm 24 are constantly meshing with the teeth of the worm gear 42. If the worm is mounted for bodily movement to and from mesh with the worm gear unless great care is exercised in bringing these parts into mesh, once they have been separated, it is likely burrs will be formed on the teeth and thereafter inaccuracies are likely to follow. With the present structure, this cannot happen as it is impossible to move the worm 24 out of mesh with the worm gear 42.

However, at times, it is desirable that the table 11 be given substantial bodily movement to roughly adjust it for a particular set up. Thereafter, the worm and worm gear drive will be depended upon to accurately complete the adjustment.

According to the present invention, under such circumstances, the operator rotates the bar or shaft 56 to open the split ring 51 and release the split sleeve 45 from tight engagement with the post 43. Now the operator may grip the table top 60 or any part of the table 11 and rotate the latter and the spindle 62 and the post 43 relative to the base 10 and independent of the gear 42.

When the rough adjustment has been made, the operator then turns the rod or bar 56 in the opposite direction drawing the lugs 54 and 55 of the split ring 51 toward one another thereby reducing the effective diameter of such split ring and collapsing the split sleeve 45 and drawing it tight against the post 43. Now the gear 42 is fixed to the post 43 and the latter being fixed to the spindle 62, movement of the table 11 relative to the base is impossible except on turning of the worm 24. However, it will be seen that on loosening of the split ring 51, the table may be turned relative to the base and independent of the worm and worm gear and without demeshing the latter.

Means are provided for securely locking the table 11 to the base 10 when a proper adjustment has been made. Such means includes a bolt 69 vertically movable in a portion of the base 10 and in one side having a notch 70 receiving an edge portion of the disc or plate 64. Through this vertically movable bolt 69 passes a shaft 71 extending radially with respect to the base and beyond an outer edge of the latter provided with a lever or hand piece 72. This shaft 71 is held against longitudinal movement as by means of a screw 73 having an end portion entering a groove 74 in the shaft. The body portion of the shaft 71 is eccentric with respect to an end portion 75 thereof and this eccentric portion of the pin bears against a button-like means 76 under an adjustable screw 77 adjustable in the direction of the length of the bolt 69.

With this construction, when the shaft 71 is turned to a locking position, its eccentric shifts the bolt 69 upwardly whereby an edge portion of the plate 64 is clamped between the lower wall of the notch 70 of the bolt and the underside of the bottom wall 12 of the base. This constitutes or provides a rigid binding action securely locking the plate or disc 64 to the base and since the plate or disc is rigid with the spindle 62, being fastened thereto by screws 65, it will be apparent that all the parts of the device are locked against any relative casual movement.

When any adjustment of the table or base is to be again made, handpiece 72 is operated rotating the shaft 71 in the opposite direction to lower the bolt 69 so as to release the edge portion of the disc or plate 64 from the described clamping action. The slot 70 in the bolt is of a height greater than the thickness of the peripheral edge portion of the plate or disc 64 so that when said bolt is in its lower or released position it has no binding action on said plate or disc. Screw 77 may be adjusted to compensate for wear or to increase the effectiveness of the eccentric mounting of the pin or shaft 71 to thereby vary the "throw" of the bolt 69.

Having thus set forth the nature of my invention, what I claim is:

1. In a rotary table, a base, a post rotatable in said base, a turret table rigid with said post and rotatable therewith on said base, a worm gear turnable about said post, a worm meshing with said worm gear and rotatable in fixed bearings and therefore constantly meshing with said worm gear, a split spring sleeve about said post and fixed to said worm gear, a clamp about said sleeve, and manually operable means for tightening said clamp and drawing said sleeve against said post to secure the worm gear thereto whereby on turning of said worm said post and thereby said turret table will be turned.

2. In a rotary table, a base, a post rotatable in said base, a turret table rigid with said post and rotatable therewith on said base, a worm gear turnable about said post, a worm meshing with said worm gear and rotatable in fixed bearings and therefore constantly meshing with said worm gear, a split spring sleeve about said post and fixed to said worm gear, a clamp about said sleeve, a rod operable to tighten said clamp and draw said sleeve tight against said post to secure the worm gear to said post for turning of the latter and said turret table on turning of said worm and for loosening the clamp to permit of turning of the turret table independent of said worm gear, and said rod extending radially in said head for bodily movement of the rod and clamp with the head.

3. In a rotary work table, a base having a rigid integral lateral extension, a post turnable in said base, a turret table fixed to said post and extending over said base, a worm gear concentric with and turnable about said post, fixed bearings in said lateral extension of the base, a worm turnable in said bearings but mounted thereby against bodily movement relative to said worm gear and constantly meshing with the latter, said worm hollow, a key fixed in said worm, a shaft entering said worm and having a portion of increased diameter receiving a portion of said key whereby the shaft and worm are connected for rotation as a unit, means outwardly of one end of said worm and fixed to said shaft for turning the latter and thus said worm, and means for securing said worm gear to said post and for releasing it therefrom whereby to have said post and turret table turn relative to the base on turning of said worm and whereby to have said turret table turnable on said base independent of said worm and worm gear.

4. In a rotary work table, a base, a post mounted by said base for turning movement relative thereto, said base comprising a wall portion having an upper annular surface concentric with said post, a turret table fixed to turn with said post and extending over said base and having an annular lower surface portion concentric with said post and bearing on the annular upper surface portion of the base, a worm and worm gear in said base and mounted in fixed constantly meshing relation, means for turning said worm, said worm gear concentric with and turnable about said post whereby the latter is turnable in the worm gear and said table may be manually grasped and rotatably adjusted, and means for clamping said worm gear to said post in any adjusted position of the table and thereby the post relative to the base and for releasing it therefrom whereby to have said post and turret table turn relative to the base on turning of said worm and whereby to have said turret table turnable on said base independent of said worm and worm gear.

5. In a rotary work table, a base, a post mounted by said base for turning movement relative thereto, said base comprising a wall portion having an upper annular surface concentric with said post, a turret table fixed to turn with said post and extending over said base and having an annular lower surface portion concentric with said post and bearing on the annular upper surface portion of the base, a gear in said base and concentric with and turnable about said post, a depending annular flange on said turret table at the inner side of its mentioned annular surface and in at least close relation with the upper side of the gear, an annular surface portion about said post on the inner side of said base at the lower side of said gear and in at least close relation therewith, means for rotating said gear, and means for securing said gear to said post and for releasing it therefrom whereby to have said post and turret table turn relative to the base on turning of said gear and whereby to have said turret table and post turnable on said base independent of said gear.

6. In a rotary work table, a base, a post rotatable in said base, a turret table rigid with said post and rotatable therewith on said base, a gear turnable about said post, a split spring sleeve about said post and fixed to said gear, a clamp about said sleeve, and means for tightening said clamp to draw said sleeve against said post and to loosen said clamp to release the sleeve from the post whereby turning of said gear results in turning of said post and turret table and whereby said turret table may be turned independent of said gear.

7. In a rotary table, a base, a post rotatable in said base, a turret table rigid with said post and rotatable therewith on said base, a worm gear turnable about said post, a worm meshing with said worm gear and rotatable in fixed bearings and therefore constantly meshing with said worm gear, a split spring sleeve about said post and fixed to said worm gear, a split ring about said sleeve, a rod operable to draw the ends of said ring toward one another and thereby tighten said split ring about said split spring sleeve and clamp the same tight to said post and thereby secure the worm gear to said post for turning of the latter and said turret table on turning of said worm and for loosening the clamp to permit of turning of the turret table independent of said worm gear, and said rod extending radially in said head for bodily movement of the rod and clamp with the head.

FREDERICK C. VICTORY.

REFERENCES CITED

The following references are of record in the file of this patent:

UNITED STATES PATENTS

| Number | Name | Date |
|---|---|---|
| 1,100,552 | Brown | June 16, 1914 |
| 1,321,291 | Dickow | Nov. 11, 1919 |
| 1,862,850 | Fritschi | June 14, 1932 |
| 1,978,373 | Romaine | Oct. 23, 1934 |
| 2,205,361 | Kearney et al. | June 18, 1940 |
| 2,342,539 | Groton | Feb. 22, 1944 |
| 2,364,478 | Schreiber | Dec. 5, 1944 |

FOREIGN PATENTS

| Number | Country | Date |
|---|---|---|
| 508,193 | France | July 19, 1920 |